INVENTORS.
RICHARD J. MOULD
GEORGE T. DOWNEY

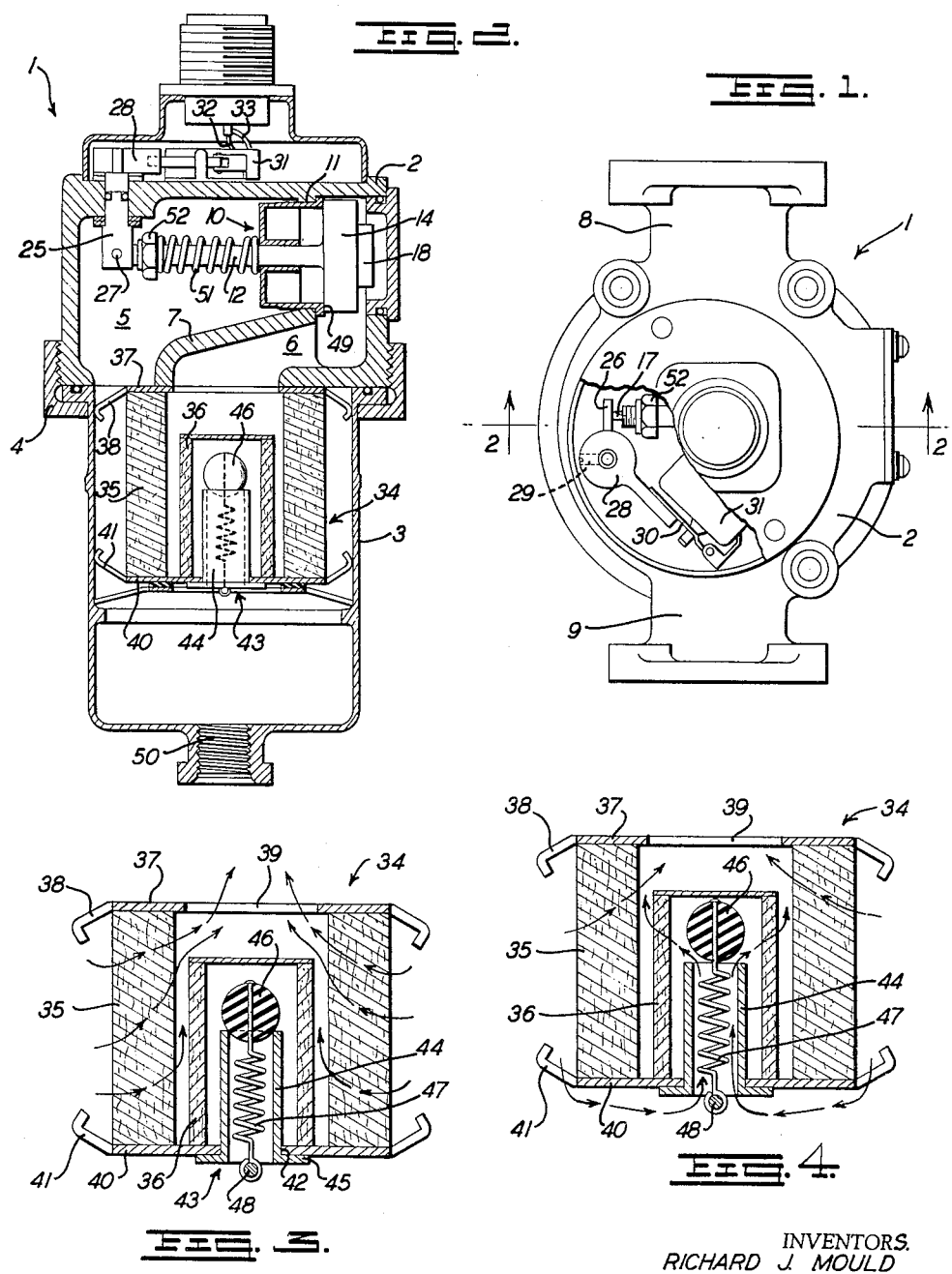

United States Patent Office 2,998,138
Patented Aug. 29, 1961

2,998,138
FILTER BYPASS INDICATOR
Richard J. Mould and George T. Downey, Corry, Pa., assignors to Aero Supply Manufacturing Company, Inc., Corry, Pa., a corporation of New York
Filed Feb. 24, 1959, Ser. No. 795,155
4 Claims. (Cl. 210—90)

This invention relates generally to filters for flowing liquids such as gasoline fuel and more specifically to improvements in filters of this type over the prior art wherein a clogged filter condition will be indicated well in advance of the opening of a by-pass for fluid in the system by the filter.

The primary object of this invention is to provide a period for positive clogged condition indication in filter units for fluids prior to the time of fluid by-pass about the filter element of the unit.

A more specific object of this invention is to provide a novel by-pass structure in a filter wherein an indication of clogged filter conditions will be indicated prior to operation of the by-pass, thereby affording time to clean or change the filter element before contaminated fluids can enter a system through the by-pass.

Another object is to provide an improved filter for fluid systems which is equipped with two filter elements, one of the elements being arranged to function only after substantially clogged conditions exist in the other element, in combination with an indicator and by-pass valve arrangement, the indicator portion of the valve arrangement becoming operative after the first filter element becomes clogged to a predetermined degree.

A further object of this invention is to provide a filter unit having a by-pass valve for fluids wherein a main filter element is automatically supplemented by an auxiliary filter element after the first filter element becomes clogged to a predetermined degree.

Another object of this invention is to provide a filter unit having a by-pass valve and indicator combination structure for fluids wherein a main filter element is automatically supplemented by an auxiliary filter element after the first filter element becomes clogged to a predetermined degree, and wherein the indicator of the combined valve and indicator structure will function to indicate the condition of the main filter element while the auxiliary filter element is properly operating and before the by-pass valve is opened.

With the foregoing and other objects in view the invention resides in the following specification and claims certain embodiments and details of construction of which are illustrated in the accompanying drawings in which:

FIGURE 1 is a partially cutaway top plan view of the filter unit comprising this invention;

FIGURE 2 is a sectioned view in front elevation of the filter unit of this invention taken along line 2—2 of FIGURE 1;

FIGURE 3 is a partially sectioned view in elevation of the filter elements of the filter unit of this invention illustrating the inner filter element in a dormant condition and illustrating in broken lines the flow path through the outer filter element;

FIGURE 4 is a partially sectioned view in elevation similar to FIGURE 3 but illustrating the filter valve open under clogged main filter conditions to place the auxiliary filter in parallel operation therewith, and further illustrating in broken lines the flow paths of the fluid through both filter elements;

Figure 5:
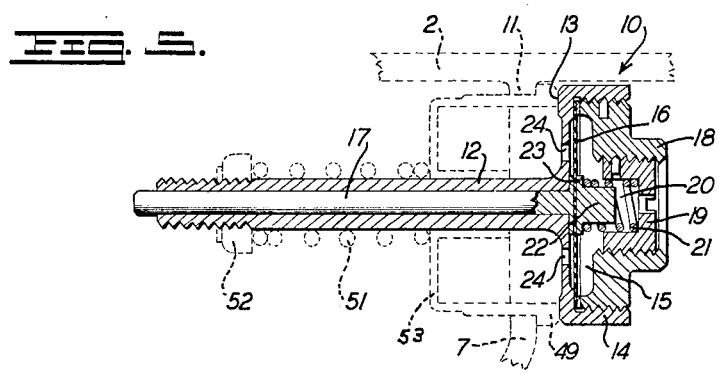
FIGURE 5 is an enlarged sectioned view of the by-pass valve utilized in the filter unit of this invention.

In fluid handling systems, such as fuel systems, filters are utilized to aid in preventing contamination of motor or engine parts. The prior art relating to filter units included pressure responsive means to by-pass a clogged filter in order to keep an engine operating whether the fuel was filtered or not. The prior art also provided for various signal indicators for clogged filters. However, no adequate provision was made in the prior art, for continuous filtering of the fuel by an auxiliary filter element after clogging of a main filter element and a resultant indication of this condition, so that steps could be taken to remove the main filter element before a by-pass element could deliver contaminated fuel to the engine. The filter unit of the present invention successfully provides the solution to this troublesome problem prevalent in the prior art.

Referring more particularly to the drawings a filter unit generally indicated at 1 is illustrated as having a top casing member 2 and a lower casing member 3 releasably secured to the member 2 by a suitable coupling 4. The member 2 is divided into an inlet chamber 5 and an outlet chamber 6 by an integral partition 7. The partition 7 is formed to provide for a passage for fluid downwardly around its lower portion and upwardly into the outlet chamber 6 as illustrated in FIGURE 2. The inlet 8 of the unit directs fluid into chamber 5, while fluid after filtration is directed from chamber 6 to outlet 9.

A by-pass valve assembly 10 is provided to control the passage of fluid between chambers 5 and 6 through a port 11 in partition 7. The valve assembly 10 as best illustrated in FIGURE 5 includes a hollow stem 12 which is integral with a valve 13. Valve 13 includes a rim portion 14 to provide a recess 15. Inserted into recess 15 is a pressure responsive diaphragm and plunger assembly, including a diaphragm 16 connected by suitable means to one end of a plunger 17. The plunger 17 extends through the hollow valve stem 12 and is freely slidable therein. The diaphragm 16 is seated against the rear surface of valve 13, and is clamped into position by a threaded insert 18. A plug 19 having a recess 20 therein is held into position in the insert 18. A coil spring 21 is seated against the inner surface of plug 19 in recess 20. The other end of the spring 21 encircles a guide member 22 on the diaphragm 16. Member 22 has a shoulder 23 on which spring 21 seats to apply pressure to diaphragm 16 to bias the same toward the left as viewed in FIGURE 5. The valve 13 is provided with a plurality of ports 24 which admit pressurized fluid from inlet chamber 5 to the surface of diaphragm 16.

The diaphragm 16 and plunger 17 operated thereby constitute a switch operating mechanism for conditioning an indicating or alarm circuit. The point at which the diaphragm 16 will move the plunger 17 far enough to the right to function as a switch operator is determined by the loading spring 21.

Associated with the plunger 17 is a pivot shaft 25 extended through and supported by the upper surface of casing member 2. A crank arm 26 is secured as by a press fit at 27 to the lower end of shaft 25 as seen in FIGURES 1 and 2. The arm 26 is engaged against the end of plunger 17. Secured to the upper end of shaft 25 is a second crank arm 28 as by means of a set screw 29. Engaging crank arm 28 is the free end of a leaf spring 30 which is secured at its other end to a switch assembly 31. In the normal adjustment of the mechanism for non-clogged filter conditions the bias of the spring 21 in the by-pass assembly acts to cause the plunger 17 to engage the crank arm 26 with sufficient force in the counter-clockwise direction of shaft 25 to prevent clockwise rotation thereof under the action of leaf spring 30. Thus the crank arm 28 acts as a positive stop for the switch assembly 31 to prevent it from rotating sufficiently to close an indicator circuit through leads 32 and 33. The details of the switch 31 have not been illustrated since it is merely typical of any number of switch units which might be responsive to movements by plunger 17 to energize an alarm or indicator circuit.

Referring now particularly to FIGURES 2, 3 and 4 it will be noted that the lower casing member 3 includes a filter assembly 34 with a pair of concentric, cylindrical filter elements 35 and 36. The outer filter element 35 is secured by any suitable means to a cap plate 37 provided with outwardly extending spring elements 38 about its periphery to properly space the filter assembly 34 with the casing member 3. Thus the filter element 35 is held in position in the passage between chambers 5 and 6. The plate 37 is provided with a large central opening 39 to provide an unrestricted exit of fluid from the filter assembly to enter outlet chamber 6. A plate 40 is secured by suitable means to the bottom of filter unit 35 and is provided with outwardly extending spring elements 41 about its periphery to assist elements 38 in properly positioning and spacing the filter assembly 34 within casing 3.

The inner filter element 36 is also located in the passage between chambers 5 and 6 and is secured by suitable means to the plate 40 in concentric relationship to the element 35. The plate 40 is provided with an opening 42 to permit fluid to enter the interior of filter element 35. However, since the element 36 is in effect a reserve or auxiliary filter, the opening 42 is normally blocked by a valve assembly 43 which includes a tubular valve seat member 44 secured by suitable means at its lower flange terminus 45 to the plate 40. Normally seated against the upper terminus of seat member 44 is a ball valve 46. Biasing valve 46 against its seat is a tension spring 47. The spring 47 is connected to the ball valve 46 at one end and at its other end to a pin 48 fixed to the lower portion of valve seat member 44. The biasing pressure of the spring 47 on ball valve 46 is predetermined to be that which will permit the ball to unseat at a desired pressure level corresponding to a partially clogged condition of the filter element 35 and prior to any opening of the by-pass valve 10. Under such a condition when the ball 46 unseats, fluid will pass through tubular seat member 44 to the interior of inner filter element 36. The non-clogged inner filter 36 then provides additional filtering area for the fluid so that the by-pass valve 10 will not function until both filters 35 and 36 have become sufficiently clogged to create a back pressure in chamber 5 great enough to unseat the valve 13 from its seat 49 on partition 7. Seat 49 is integral with the valve stem cage 53.

A drain port 50 is provided at the bottom of casing member 3 and may be plugged or valved by means not illustrated.

Figure 6:
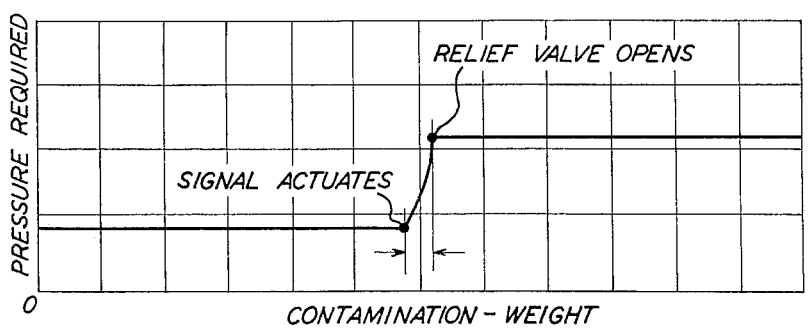
FIGURE 6 is a chart on filter and indicator performance of a similar filter unit of the prior art.
Figure 7:
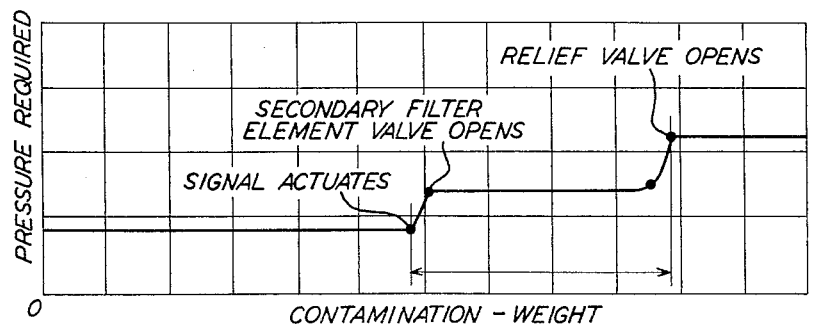
FIGURE 7 is a chart on filter and indicator performance of the filter unit of the present invention.

The operation of the filter unit should be readily obvious to one skilled in the art. With pressurized fluid received in inlet chamber 5 and with filter element 35 in clean condition, then fluid will pass from the inlet 8 to the outlet 9 through filter 35 as indicated by the flow lines in FIGURE 3. Under these conditions the plunger 17 is biased to prevent operation of the switch 31. The loading of a compression spring 51 on valve 13 between the tubular stem 12 thereof and its seat assembly 49 is such as to prevent unseating of valve 13 below a predetermined level. The level may be adjusted by adjustment of the spring loading nut 52, against which one end of spring 51 bears. Further, the loading of valve 46 by the spring 47 keeps this valve seated below a predetermined pressure level. Now, when fluid contamination causes a rather substantial clogging of filter element 35, the diaphragm 16 will move plunger 17 to the right as viewed in the drawings to permit operation of the switch 31 through pivot shaft 25 to indicate by means not shown the clogged filter condition. At substantially the same pressure level the ball 46 will unseat to permit the inner filter 36 to function. The flow lines under these conditions are illustrated in FIGURE 4. The filtering area of the inner element 36 added to the non-clogged area of the outer element 35, results in a continuing uninterrupted flow of filtered fluid from outlet 9 until the combined areas of both filtering elements become sufficiently clogged as to create a back pressure in chamber 5 great enough to overcome spring 51 and unseat the by-pass valve 13. At this point the filter assembly 1 will direct unfiltered fluid from inlet 8 to outlet 9. However, the construction of this invention is such as to provide a time delay between clogged filter indication and by-pass operation. FIGURES 6 and 7 compare typical prior art performance of the filter with the performance of the filter comprising this invention. By observing FIGURE 6 it will be noted that only a small interval occurs between signal actuation and relief or by-pass valve operation. In FIGURE 7 the performance of the filter of this invention illustrates effectively the time delay between signal actuation and by-pass valve operation due to the increased filtering area of filter 36 as the valve 46 is opened. Under these conditions it should be obvious that upon observation of a clogged filter condition indicator with this invention, one may clean or replace the filter element 35 before the filter element 36 is fully utilized, and, more significantly, before any unfiltered fluid is sent through the by-pass to a system where contaminated fluid might do substantial harm.

It is realized that the structure of this invention might be subjected to numerous modifications well within the concepts of the invention as set forth in the appended claims.

We claim:

1. A filter unit for fluid systems comprising a casing including an inlet chamber and an outlet chamber at least two independent passage means connecting said chambers, plural filter elements in said casing located in the path of one of said passage means between the inlet and outlet chambers, means to cause actuation of an indicator energizing switch, responsive to a partially clogged condition of one of said filters, valve means located in the other of said passage means between the inlet and outlet chambers to by-pass fluid around the filters under predetermined clogged filter conditions, and pressures responsive means to direct a portion of the fluid through a second filter element, said pressure responsive means becoming operative at substantially the same time as said indicator switch actuating means functions, said second filter element adding sufficient non-clogged filtering area for the fluid to create a time delay between clogged filter indication and by-pass valve operation.

2. A filter unit for fluid systems including a first filter element defining a first flow path, a second filter element defining a second flow path, first pressure responsive means to insert said second filter in parallel flow relationship to said first flow path, second pressure responsive means defining a third flow path in said unit separate from said first and second flow paths to pass fluid directly through said unit and around said filter elements in parallel flow relationship thereto at a predetermined fluid pressure level caused by clogged filter element conditions, said first pressure responsive means being operative at a pressure level below the operative pressure level of said second pressure responsive means, and indicator actuating means responsive to a predetermined clogged condition of said first filter element, said indicator actuating means being pressure actuated at substantially the same pressure level as said first pressure responsive means.

3. A filter unit for fluid systems comprising a casing including an inlet chamber and an outlet chamber, a first filter element located in a first passage between said inlet and outlet chambers, fluid by-pass means located in a second passage between said inlet and outlet chambers to pass fluid directly from the inlet chamber to the outlet chamber when said first filter element is clogged to a predetermined degree, indicator actuating means associated with said by-pass means and responsive to a predetermined increased pressure due to a clogged filter condition of said first filter element, a normally dormant second filter element located in said first passage, and means responsive to said predetermined pressure to insert the second filter element in parallel flow relation to the first filter element to prevent operation of the by-pass means until a considerable time delay after operation of the indicator actuating means.

4. A filter unit for fluid systems comprising a casing including an inlet chamber and an outlet chamber, a first filter element mounted in said casing in a first passage between said inlet and outlet chambers, pressure responsive by-pass valve means located in a second passage between said chambers to pass fluid directly from the inlet chamber to the outlet chamber when said first filter element is clogged to a predetermined degree creating an increased pressure level in the inlet chamber, switch means mounted in said casing to condition an external circuit when actuated, a diaphragm mounted in said by-pass means and subject to the fluid pressure in said inlet chamber, linkage means controlled by said diaphragm to actuate said switch means in response to a predetermined pressure prior to the unseating pressure level of said by-pass valve, a normally dormant second filter element, and pressure responsive valve means to insert said second filter element in the flow path of the first passage in parallel flow relation to the first filter element at an inlet pressure level of substantially the same magnitude selected to cause said diaphragm to move the linkage whereby said by-pass valve is precluded from unseating until after a considerable delay relative to the operation of the indicating switch means.

References Cited in the file of this patent

UNITED STATES PATENTS

| | | |
|---|---|---|
| 2,617,535 | Hamilton | Nov. 11, 1952 |
| 2,801,751 | Thomas | Aug. 6, 1957 |
| 2,879,892 | Frakes | Mar. 31, 1959 |

FOREIGN PATENTS

| | | |
|---|---|---|
| 563,687 | Great Britain | Aug. 28, 1944 |